United States Patent
Segel et al.

(10) Patent No.: US 10,135,709 B1
(45) Date of Patent: Nov. 20, 2018

(54) TRACKING WORK IN AN ASYNCHRONOUS APPLICATION OR SERVICE DURING LOAD TESTING

(71) Applicant: Amazon Technologies, Inc., Seattle, WA (US)

(72) Inventors: Phillip Scott Segel, Auburn, WA (US); Carlos Alejandro Arguelles, Shoreline, WA (US); Aman Ahmed, Seattle, WA (US); Ryan Preston Gantt, Seattle, WA (US); Brian Thomas Kachmarck, Seattle, WA (US); Michael Leo Weiss, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 15/175,946

(22) Filed: Jun. 7, 2016

(51) Int. Cl.
*H04L 29/08* (2006.01)
*H04L 12/26* (2006.01)

(52) U.S. Cl.
CPC .......... *H04L 43/0876* (2013.01); *H04L 67/10* (2013.01)

(58) Field of Classification Search
CPC ... H04L 67/02; H04L 67/1002; H04L 67/101; H04L 61/1511; H04W 4/00; G06F 11/3409; G06F 11/3006
See application file for complete search history.

(56) References Cited

U.S. PATENT DOCUMENTS

| | | | |
|---|---|---|---|
| 2011/0202645 A1* | 8/2011 | Abdelal | G06F 11/3688 709/223 |
| 2012/0278293 A1* | 11/2012 | Bulkowski | G06F 17/30575 707/703 |
| 2017/0010947 A1* | 1/2017 | Lu | G06F 11/3409 |

\* cited by examiner

*Primary Examiner* — Kim T Nguyen
(74) *Attorney, Agent, or Firm* — Patterson + Sheridan, LLP

(57) ABSTRACT

Embodiments presented herein provide techniques for evaluating an asynchronous application using a test framework. The test framework may perform a load test of an asynchronous application or service composed from a collection of applications or services. To do so, the test framework may submit transactions to a distributed application at a specified transaction rate and monitor how the distributed application operates at that transaction rate. An aggregate load test component may evaluate the remaining work pending at work accumulation points of the distributed application to determine whether the distributed application can sustain the specified transaction rate. A transaction tracking component may initiate transactions to generate load at the specified transaction rate without blocking while the transactions are processed by the distributed application.

20 Claims, 10 Drawing Sheets

TRACKING WORK IN AN ASYNCHRONOUS APPLICATION OR SERVICE DURING LOAD TESTING

This application relates to approaches for testing computing systems and services. More specifically, this application relates to load testing asynchronous applications and to a transaction generator which can generate non-blocking concurrent requests while testing an asynchronous application.

It is common for an enterprise to evaluate whether new (or updated) software applications or services function correctly. Software testing is typically performed using a framework or test environment where the framework "drives" execution of the application being tested to generate test results. For example, unit testing may determine whether components application operates as expected or complies with a set of technical requirements or contract specifications. In addition, software applications and services may be subjected to load testing. Generally, load testing refers to a process of sending requests or transactions ("load" or "demand") to a software application or service and observing responses (or other activity) generated by the system under test. For example, load testing can be used to evaluate software applications which provide network accessible services or which respond to or process requests from clients, peers, or servers. Load testing is often performed to determine the response time of an application under both normal and anticipated peak load conditions. Load testing may also be performed to determine the maximum load an application or service can sustain before failing or before degrading beyond specified tolerances (e.g., tolerances for response latency).

Load testing is typically used to test individual components of a distributed application or service, where the outcome of a given request can be directly measured at the time the request is made. That is, load testing is typically performed against a synchronous application, where the application under test receives a request and generates a response directly.

For synchronous load testing, e.g., a test author defines a transaction or request processed by the system under test along with parameters specifying how much demand to apply to the application during the load test. In response, the test framework generates instances of the transaction according to the parameters of the test and the framework records metrics that indicate how the application under test responded to the demand load.

However, this approach is ineffective for load testing an asynchronous service or application. Simply put, this is because load testing frameworks cannot directly measure whether a given transaction succeeded or how long a given transaction took to complete when testing an asynchronous service or application. For example, for distributed systems that have components such as queues or multi-system workflows, the framework managing a load test does not know whether a given request or transaction succeeded or failed. For example, assume a load generator submits a request or a transaction for processing to a queue service, where the queue stores requests a workflow service. When a load generator submits a new request to the queue, a widely variable amount of time may elapse before being consumed by the workflow service, and the load generator cannot determine from successfully submitting the request to the queue whether the transaction itself is processed successfully by the workflow or measure the latency of the workflow under different loads (or latency of the asynchronous application composed from the queue and the workflow services). Further, simply waiting for a response from the asynchronous application or service (e.g., the results of the workflow) may overwhelm the resources of a test framework, as each open transaction consumes resources of the test framework until finalized.

DETAILED DESCRIPTION

Figure 1:
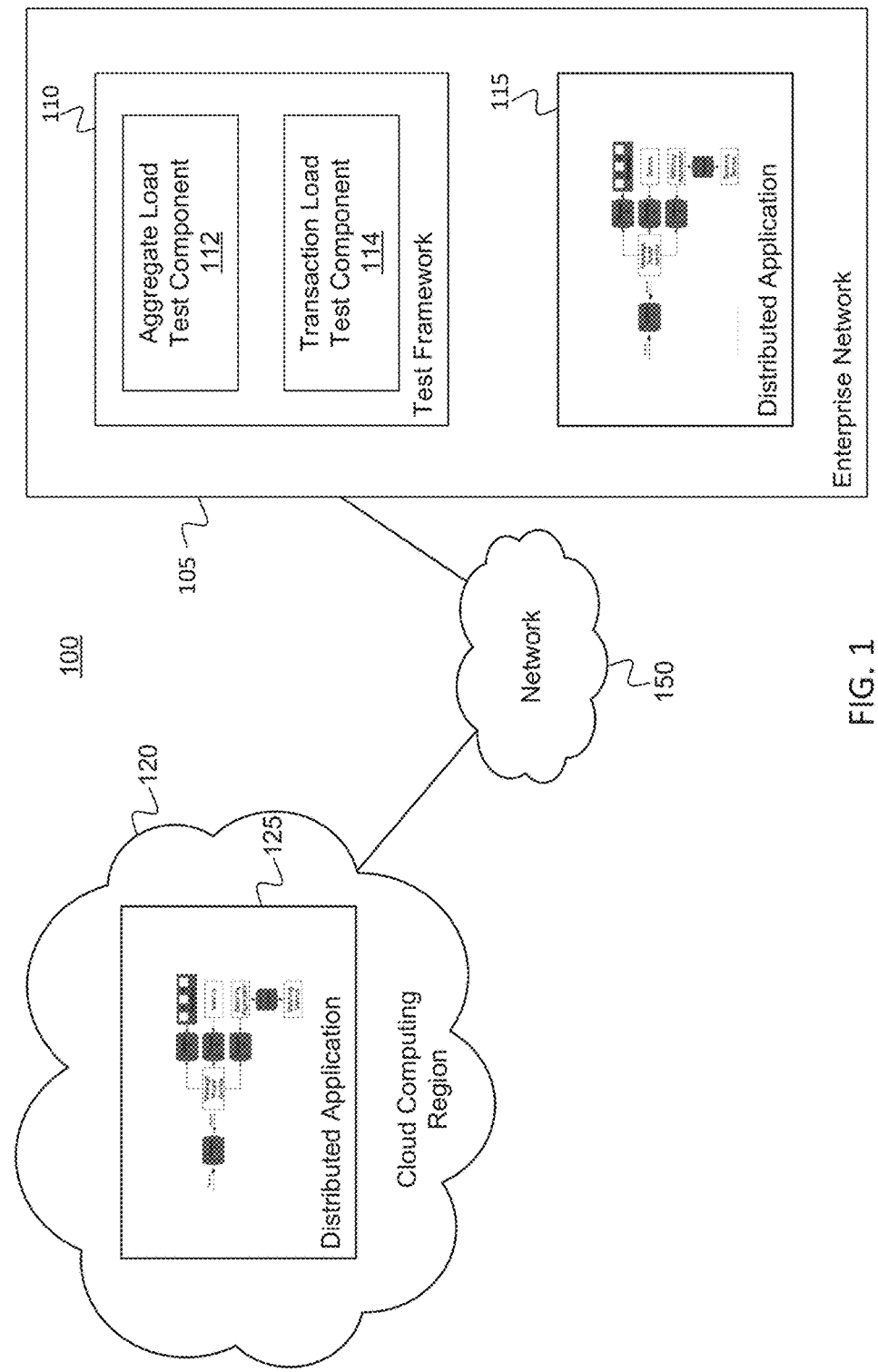
FIG. 1 illustrates an example of a computing environment used to load test an asynchronous computing service or application, according to one embodiment.

Embodiments presented herein provide techniques for evaluating an asynchronous application using a test framework. For example, the test framework may perform a load test of a distributed application composed from a collection of applications or services. To do so, the test framework may submit transactions to the distributed application at a specified transaction rate (typically measured as transactions per second (TPS)) and monitor how the distributed application operates at that transaction rate.

During a load test, the test framework monitors how much work has accumulated at one or more work aggregation points within the distributed application. That is, the test framework monitors how much work is waiting to be processed at points in the distributed application where work could accumulate while transactions are processed. For example, the test framework could periodically measure metrics such as queue depth, counts of open workflows, bytes of data at a batch service, or other points in an application where transactions can accumulate before completing. In cases where a production service or application is subjected to load testing, the test framework may supplement an observed production load on the service with additional transactions to reach the given TPS rate.

Generally, if the amount of work remaining at an aggregation point is increasing while the distributed application is subjected to a relatively stable TPS rate, then the distributed application may be unable to sustain that TPS rate. That is, the distributed application would eventually fail or degrade if the demand load remained at or above that TPS rate. Note, the actual point in time that the service would fail or begin to degrade would depend on the rate of increase at an aggregation point and the capabilities of the distributed application.

In addition to generating load on a distributed application at a specified transaction rate, the test framework may also vary the transaction rate during testing to determine a maximum sustainable rate for a distributed application. In one embodiment, the test framework sends transactions to the distributed application at an initial TPS rate for a specified time interval and polls each aggregation point during the interval to determine how much work is remaining. Following the time interval, the test framework determines whether the work at any of the accumulation points is stable or increasing. If each accumulation point is stable, the TPS rate is increased and the framework monitors the amount of work at the accumulation points over another interval. This process repeats until a TPS rate is reached where the distributed application is unable to keep up and begins to fall behind.

In one embodiment, e.g., the test framework doubles a TPS rate each interval until identifying a TPS rate where the remaining work at one or more of the accumulation points increases (indicating the system is unstable at that TPS rate). Once identified, the test framework decreases the transaction rate until identifying a rate at which the distributed application is able to keep up. The point at which the incoming transaction rate is at the brink of rendering the distributed application unable to keep up is the maximum transaction rate. This approach should rapidly allow the test framework to converge on a maximum TPS rate—limiting the time the distributed application is subjected to artificial load. In some cases, however, the doubling of the TPS rate applied by the test framework could be limited to a maximum TPS rate. For example, an enterprise offering a production service may want to limit how much load can be applied by the test framework to computing systems in production use or limit how much the load can change at any given point. In such cases, the TPS rate could be applied incrementally up to a maximum TPS rate or doubled up to a specified rate and increased incrementally thereafter. Of course, other approaches for how much load to apply to a distributed application, how, and how often to increase or decrease the TPS rate during load testing may be tailored as needed in an individual case.

Advantageously, this approach can identify the maximum transaction rate a distributed application or service can handle without failing as a consequence of the demand on the application. Further, this approach can identify the resulting throughput the application can provide, identify bottlenecks in the application, and allows very complex applications, or sets of applications, to be subjected to load testing.

As described, the test framework identifies how much work is present at points where work can accumulate in order to determine whether work is accumulating at some point within the distributed application in an unsustainable manner. However, this approach does not retain visibility to the individual transactions generated during a load test. Thus, in one embodiment, the test framework may also include a non-blocking load generator which can track individual transactions initiated on a distributed application during a load test. This latter approach allows a variety of performance metrics to be generated during load testing, as well as determine whether the distributed application can handle a given TPS rate, measure individual transaction latency, fault rates, etc.

Transactions generated against a distributed application may require a relatively long time to finish. Rather than tie up resources of the test framework for each concurrent transaction initiated by the load generator, the test framework may generate a container for each transaction. In one embodiment, the transaction generator passes the container for a transaction to a load generator. In turn, the load generator initiates a new transaction on the distributed application. Each such transaction may be associated with an identifier or handle stored by the test framework while the distributed framework performs the requested transaction. For example, in some cases the component of the distributed application receiving transaction requests could acknowledge each request with an identifier. In other cases, the load generator could invoke client logic used to create a transaction request which generates an identifier. However received or obtained, the identifier is stored with the transaction container and the time the transaction was initiated.

Once generated, the test framework can free or reuse any resources allocated to generate or kick off the transaction—resources that would otherwise become blocked until the transaction is complete. That is, any resources used by the either the transaction generator or load generator to initiate the transaction may be freed or reused for other transactions. Thus, the test framework decouples the process of waiting for a given transaction to complete from resource utilization during the waiting interval. Doing so ensures the test framework does not become overwhelmed by resources blocked by large numbers of pending transactions.

Further, this approach allows the test framework to keep track of the results for each individual transaction generated during load testing. The test framework may include a mechanism to identify when each transaction has been processed. For example, the test framework may poll the distributed application to identify what transactions have been completed or receive message that a given transaction has completed. The test framework may also include functions used to call into components of the distributed application to determine a current state using the appropriate transaction handle.

Once a transaction is complete, results are passed back to the container, which can execute any arbitrary code associated with the load test (e.g., a Java callable) and the test framework can record how long it took for the transaction to complete, along with any other performance metrics that are relevant for a particular case. With this data the test framework can determine, e.g., a rate at which transactions are completing, measure transaction latency, and faults. When a transaction completion rate is generally equal to the TPS rate, the maximum transaction rate has been reached.

Note, embodiments of the invention are described below using specific examples of a distributed application subjected to load testing using a test framework. Of course, one of ordinary skill in the art will recognize that the approaches for load testing asynchronous applications and services described herein may be adapted for use with a variety of such application and services, including distributed applications composed using services or resources obtained from a cloud computing services provider.

FIG. 1 illustrates an example computing environment 100, according to one embodiment. As shown, the computing environment 100 includes an enterprise network 105 and a cloud computing region 120, which communicate over a network 150 (e.g., the internet). In this example, the enterprise network 105 hosts a test framework 110 and an instance of a distributed application 115.

Figure 3:
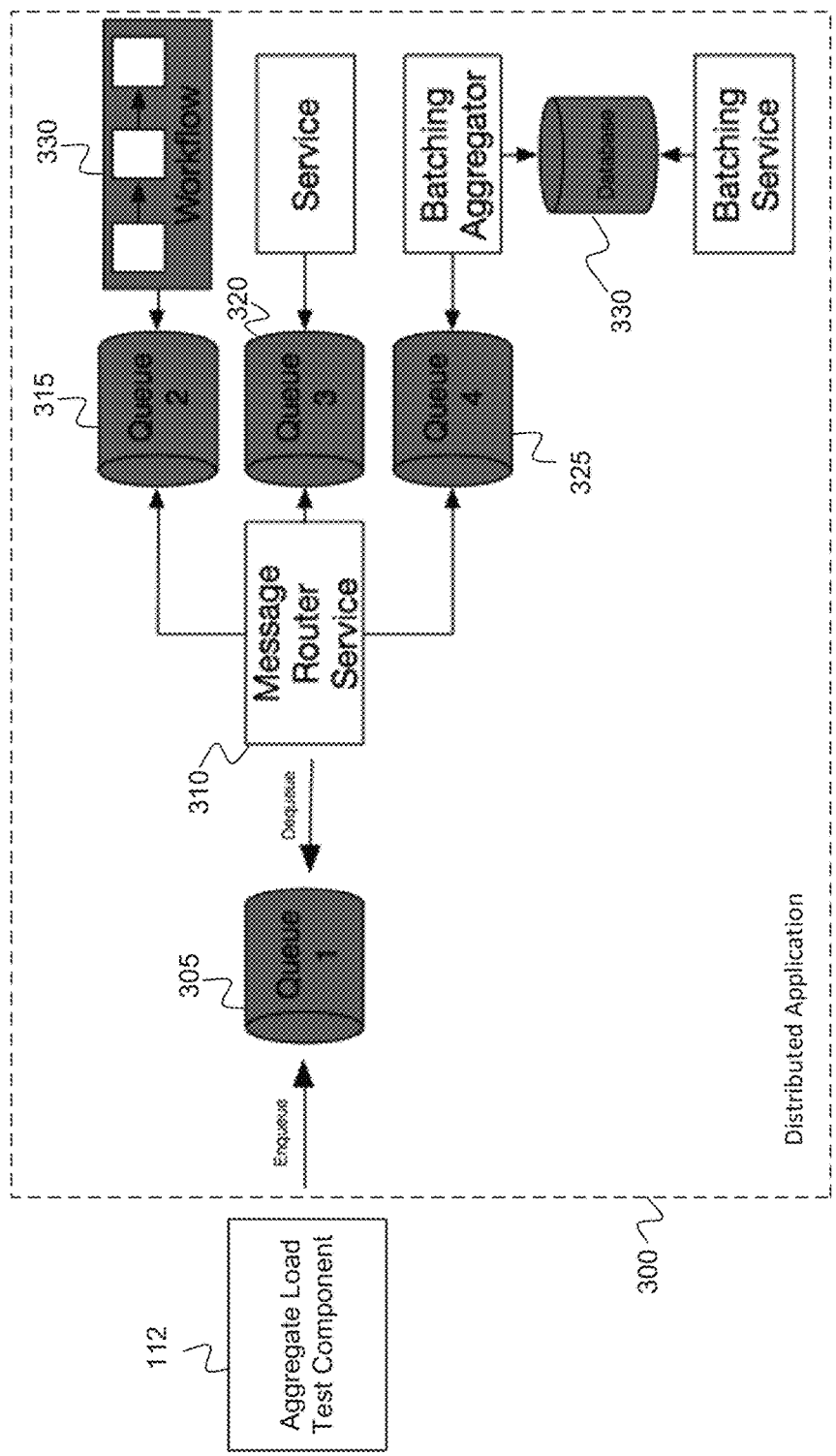
FIG. 3 illustrates an example of an asynchronous service subjected to load testing using the aggregate load test component of FIGS. 1 and 2, according to one embodiment.

As described in more detail in the example of FIG. 3, distributed application 115 may be composed using instances of other computing services and applications connected together to provide a service to client systems. For example, distributed application 115 could be exposed as a web site where users interact with the application 115 by navigating web pages requested from a web server. In such a case, distributed application 115 could be composed using message and queuing servers, web servers, application servers, database systems, storage repositories, and the like.

In another case, the applications or services used to provide distributed application 115 could be exposed as a web service defined using a service description language (e.g., WSDL). Service description languages, such as WSDL, define a machine-readable format for describing a network address or location for a web service, protocols supported by the web service, interfaces exposed by the web service, parameters passed to API calls defined by the web service, and data structures returned by API calls defined by the web service. The operations and messages provided by a web service are described abstractly in the serviced definition and bound to a concrete network protocol and message format to define an endpoint. Of course, one of ordinary skill in the art will recognize the techniques for load testing an asynchronous application or service may be adapted for use with a variety of service description languages, web service frameworks, software architecture styles (e.g., Representational State Transfer (REST)), message protocols, markup languages, and data interchange formats (e.g., XML, JSON).

In still another case, a distributed application may be composed using cloud computing services offered as an on-demand computing platform by a service provider. For example, distributed application 125 may be provisioned on cloud computing region 120 using virtual machines, network and storage resources, message queues, monitoring services, notification services, workflow services, and other services offered by a cloud computing host.

Cloud computing region 120 generally corresponds to a region defined by a service provider in offering cloud based services to clients (e.g., services used to provision and launch distributed application 125). While cloud computing regions may be drawn along arbitrary boundaries, cloud computing regions often correspond to geographic, national, or fault tolerance boundaries, where computing resources in one region are deployed and managed in a manner that is generally isolated from other regions. For example, cloud computing region 120 may correspond to a data center (or data centers) located in a particular geographic area. Data centers in different regions may help provide fault-tolerant services, e.g., should a data center in one region become inaccessible, other data centers in that region (or other regions) may continue to operate with little or no interruption to the services hosted in such regions. Further, the provider may enable multiple physical or logical zones within a given cloud computing region. For example, a single data center used to provide a cloud computing region may offer multiple, fault tolerant availability zones, where a service disruption in one availability zone does not impact other availability zones within the same cloud computing region (or other regions) and the availability zones within a region may provide inexpensive, low-latency network connectivity to other availability zones within the same region.

Distributed applications 115, 125 may be subjected to load and performance testing to ensure the distributed application 115, 125 operate with acceptable latency at an expected production load, identify how well a distributed application 115, 125 scales in response to spikes in demand, and determine a maximum production load the distributed application 115, 125 can support. For example, to perform load testing, the test framework 110 may invoke API calls exposed by distributed application 115, 125 at a TPS rate sufficient to apply an expected production load. In addition to being deployed within the enterprise network 105, test framework 110 may be deployed to any network accessible location. That is, test framework 110 may access distributed application 115, 125 server over an open network 150, e.g., from the internet. Doing so allows the test framework 110 to access the distributed application 115, 125 during testing in the same general manner as client systems.

Illustratively, the test framework 110 includes an aggregate load test component 112 and a transaction load test component 114. In one embodiment, the aggregate load test component 112 provides one or more software applications configured to determine whether distributed application 115, 125 can support a given production load. To do so, the aggregate load test component 112 may generate transactions submitted to the distributed application 115, 125. In turn, the aggregate load test component 112 monitors how much work is waiting to be processed at points in the distributed application 115, 125 where work could accumulate. For example, the aggregate load test component 112 may measure metrics such as queue depth, counts of open workflows, bytes of data at a batch service, or other points in an application where transactions can accumulate before completing while distributed application 115, 125 is subjected to a given TPS rate. The resulting metrics are evaluated to determine whether distributed application 115, 125 can handle the given TPS rate. For example, if the sampled performance metrics indicate that the amount of remaining work at one (or more) of the accumulation points is increasing while the TPS rate is held relatively constant, then the distributed application 115, 125 is presumed to be unable to handle that TPS rate.

In addition to testing distributed application 115, 125 using a relatively constant TPS rate, the aggregate load test component 112 may determine a maximum TPS rate that distributed application 115, 125 can sustain. To do so, the aggregate load test component may increase the load on distributed application 115, 125 until reaching a TPS rate where the remaining work at least one of the accumulation points begins to increase. Or stated differently, the load may be increased until one of the components or services used to provide distributed application 115, 125 begin to fall behind. Once reached, the TPS rate can be reduced until the remaining work at each accumulation points is stable (i.e., relatively constant or decreasing).

Note, in some cases, distributed application 115, 125 may include components configured to automatically scale capacity in response to demand. In such a case, such components could be limited from scaling during load testing (or scaling beyond a specified limit). Conversely, the load test may be used to confirm that certain components in the distributed application 115, 125, in fact, scale in response to demand in order to handle a given TPS rate.

In one embodiment, the transaction load test component 114 provides one or more software applications configured to monitor or track individual transactions during load testing, without reserving or consuming resources on the test framework 110 while each transaction is completed by the distributed application 115, 125. That is, the transaction load test component 114 does not tie up resources of the test framework 110 for each concurrent transaction initiated during load testing. Instead, in one embodiment, the transaction load test component 114 may generate a container for each transaction. The transaction load test component 114 associates an identifier assigned to a given transaction by the distributed application 115, 125 with the container generated by the transaction load test component 114. The container may also store a time a given transaction is initiated.

Generally, the distributed application 115, 125 uses the identifier to identify a given transaction while it is being processed. Consider, e.g., a retail website offering digital media for sale online. To support the retail website, distributed application 115, 125 could provide an order fulfillment pipeline. In such a case, when customer places an order, the distributed application 115, 125 could use a distinct order unique order assigned to a purchase to identify that order as different applications in the fulfillment pipeline complete the transaction. In this particular example, the distributed application 115, 125 could include a queue for storing new orders, a payment processing application used to process payment card information, and a fulfillment workflow which distributes digital media after a payment has been verified.

Using this example, the order ID assigned to a transaction could be passed to the transaction load test component 114 and stored with the transaction container. Once stored, the test framework 110 can free or reuse any resources allocated to generate or kick off this transaction (e.g., to initiate a new order transaction)—resources that would otherwise become blocked until the transaction is complete. Once a transaction is complete, results are passed back to the transaction load test component 114, which can execute any arbitrary code associated with the load test. For example, the container may reference objects or functions (e.g., a Java callable) provided by the framework 110 which record how long it took for a transaction to complete along with other performance metrics. Further, the test framework could also invoke functions or objects supplied by a party performing the load test. That is, the performance metrics captured by the test framework 110 may be extended to capture any information that is relevant for a particular case or to perform other actions associated with a given load test. The resulting metrics may identify, e.g., a rate at which transactions are completing as well as provide individual transaction latency. During load testing, a maximum transaction rate which distributed application 115, 125 can sustain may be determined as the maximum TPS rate which is less than or equal to a transaction completion rate.

Figure 2:
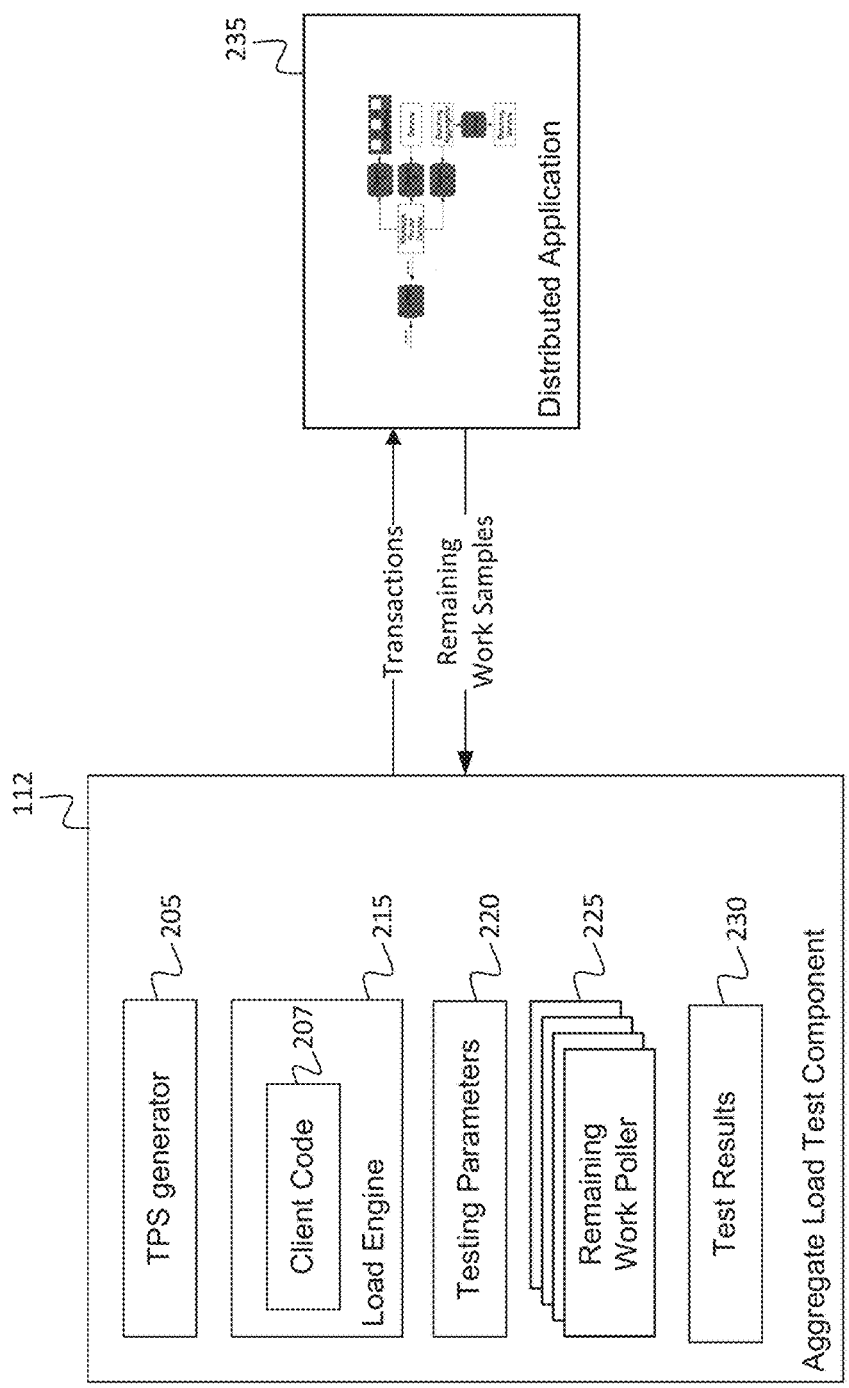
FIG. 2 further illustrates an aggregate load test component configured to test an asynchronous application or service, according to one embodiment.

FIG. 2 further illustrates an aggregate load test component 112 configured to test an asynchronous application or service, according to one embodiment. As shown, the aggregate load test component 112 includes a TPS generator 205, a load engine 215, test parameters 220, remaining work pollers 225, and test results 230. In this example, the aggregate load test component 112 is used to carry out load and performance testing on a distributed application 235.

The TPS generator 205 generally provides software components used to load test distributed application 235 by generating transaction requests submitted to the load generator 215 at a TPS rate specified in test parameters 220 and evaluating the behavior of the distributed application 235 in response. The load engine 215 initiates new transactions as requested by the TPS generator 205. In one embodiment, load engine 205 may initiate a new transaction on the distributed application 235 by invoking client code 207. The client code 207 may provide functions or other the execution logic used to exercise the distributed application 235 during load testing. That is, the client code 207 provides the methods, functions, instructions, scripts or other executable code used to initiate transactions on the distributed application 235 and process any response. Returning to the example of a retail website, the client code 207 could be used to establish a connection with the website, initiate, and complete an order. Of course, the activity of client code 207 would depend on the underlying distributed application 235 being subjected to load testing by the aggregate load test component 112.

During load testing, the TPS generator 205 may determine how much work has accumulated at points in the distributed application 235 based on the testing parameters 220. For example, the test parameters 220 may specify a desired TPS rate to apply to the distributed application 235 (or an initial rate to apply). The test parameters 220 may also specify a time interval indicating how long the desired load should be applied before capturing the amount of remaining work at each accumulation point (or increasing the TPS rate or applied load) and how long a given TPS rate should be applied overall. Testing parameters 220 may also specify a frequency at which to capture how much remaining work is present at each accumulation point during load testing and any cool down period between time intervals.

If being used to determine a maximum TPS rate, the parameters 220 could also specify how long to run at a sustained TPS rate before increasing the TPS rate, a step rate (e.g., a step rate that doubles or increases by a specified amount), and a precision value specifying a granularity for a maximum TPS rate (e.g., integer TPS rate or steps of 0.5 between integer TPS rates). The test parameters 220 could also include a maximum TPS rate to apply to distributed application (e.g., where distributed application 235 is tested to ensure it can handle an anticipated peak load) or a minimum TPS rate the distributed application 235 needs to be capable of sustaining in order pass a load test.

The remaining work pollers 225 are generally configured to determine how much remaining work is pending at a point in the distributed application 235 where work can accumulate. For example, when the load engine 215 sends a transaction to the distributed application 235 (e.g., via client code 207), the transaction may be actively processed or be in a waiting state where the transaction is waiting for to be processed at points within the distributed application 235. The process to complete a transaction may include any number of intermediate steps. Remaining work is measure of in-progress work and at an intermediate point where an accumulate. For example, remaining work could include a measure of queue depth, a count of waiting or in-progress workflows, amounts of persisted data (e.g., in a staging database) to be processed later (e.g., by a batch service). Of course, the points where work may accumulate will depend on the applications, systems, or services used to provide distributed application 235 as will the appropriate measure of remaining work at a given accumulation point. Further, the remaining work pollers used to sample the remaining work at accumulation points may be provided by the owner of the distributed application 235 (e.g., as a Java callable).

Generally, if distributed application 235 can sustain a given TPS rate, then the amount of remaining work at each accumulation point should stabilize around a value sometime after the TPS rate is applied to the application 235. In contrast, if the distributed application 235 cannot sustain a given TPS rate, then the amount of work remaining at one or more of the accumulation points does not stabilize, In such a case, the remaining work is expected to continue to increase so long as load continues to be applied at the that TPS rate—meaning the distributed application cannot sustain that TPS rate.

Test results 230 are included to be representative of any performance metrics or other data generated during load testing. For example, the test results 230 may indicate a maximum sustainable TPS rate identified by the aggregate load test component 112 and an indication of which component in distributed application 235 was unable to scale beyond the maximum sustainable TPS rate (i.e., the TPS rate where the remaining work at one of the components of the distributed application 235 would continually increase until eventually causing the application 235 to degrade or fail).

FIG. 3 illustrates an example of an asynchronous service subjected to load testing using the aggregate load test component of FIGS. 1 and 2, according to one embodiment. In this example, distributed application 300 generally corresponds to the distributed applications 115, 125, and 135 of FIGS. 1 and 2.

The aggregate load test component 112 applies load to the distributed application 300 by generating transactions at a given TPS rate, as described above. In this example, a first queue 305 processes transaction requests and a service queue routes requests to workflow, a service, or a disk-based batching process. More specifically, the distributed application 300 includes a queue 305 which receives transaction requests from the aggregate load test component 112. In turn, a message router service 310 retrieves items from the first queue 305 and routes them to a second queue 315, third queue 320, or a fourth queue 325. Further, items from the second queue 315 are passed to an instance of workflow 330. Items from the third queue 320 are processed by a service 335 and items from the fourth queue 325 are processed by a batching aggregator 340. In turn, the batching aggregator 340 stores items dequeued from fourth queue 325 in database 330, which are later processed by the batching service 345. For clarity, the distributed application is 300 is composed explicitly from queues, services, and workflows. However, the work accumulation points for a distributed application may be internal or logical components of applications or services included the distributed application. For example, a message routing application may use queues and other structures internally to store pending work. And a remaining work poller could invoke an APIs used to inspect the current state of an application to learn how much work is waiting to be processed or stored in internal queues or other structures. That is, in some cases, an application may self-report how much work is remaining to be processed by components of that application.

In this example, while the aggregate load test component 112 generates load on the distributed application at a specified TPS rate, the remaining work pollers may periodically sample queues 305, 315, 320, and 325 to determine a then current queue depth (i.e., a measure of remaining work on each queue). Similarly, another remaining work poller may sample the workflow 330 to see how many instances of the workflow 440 are running and incomplete and another remaining work poller may determine an amount of data persisted in database 330. The Aggregate load test component 112 evaluates the samples to determine whether the amount of work at any of these accumulation points, i.e., the remaining work at one of the queues 305, 315, 320, and 325, the workflow 330, or the database 330, is increasing while under test at a relatively constant TPS rate.

In one embodiment, the aggregate load test component 112 may collect the sample data points captured for one of the accumulation points while the application 300 is under load at a given TPS rate. Note, some of the points may be discarded (e.g., the oldest half). Doing so helps account for an unknown delay between when transactions are applied at a given TPS rate and when they are "felt" in the distributed application 300. Therefore, the earliest data may be untrustworthy since it could be data points reflecting behavior of the application 300 at prior TPS rate. After identifying the data points to consider, the aggregate load test component 112 may apply a clustering algorithm to determine if the remaining points are clustered together or not. For example, a density based clustering algorithm such as DBSCAN may be used. If any clusters are formed from the sample data—indicating that the measure of remaining work at an accumulation point tended to be stable around a value corresponding to a cluster—then that component of the distributed application 300 may be presumed to be able to handle the load generated at the TPS rate of the current iteration.

Figure 4:
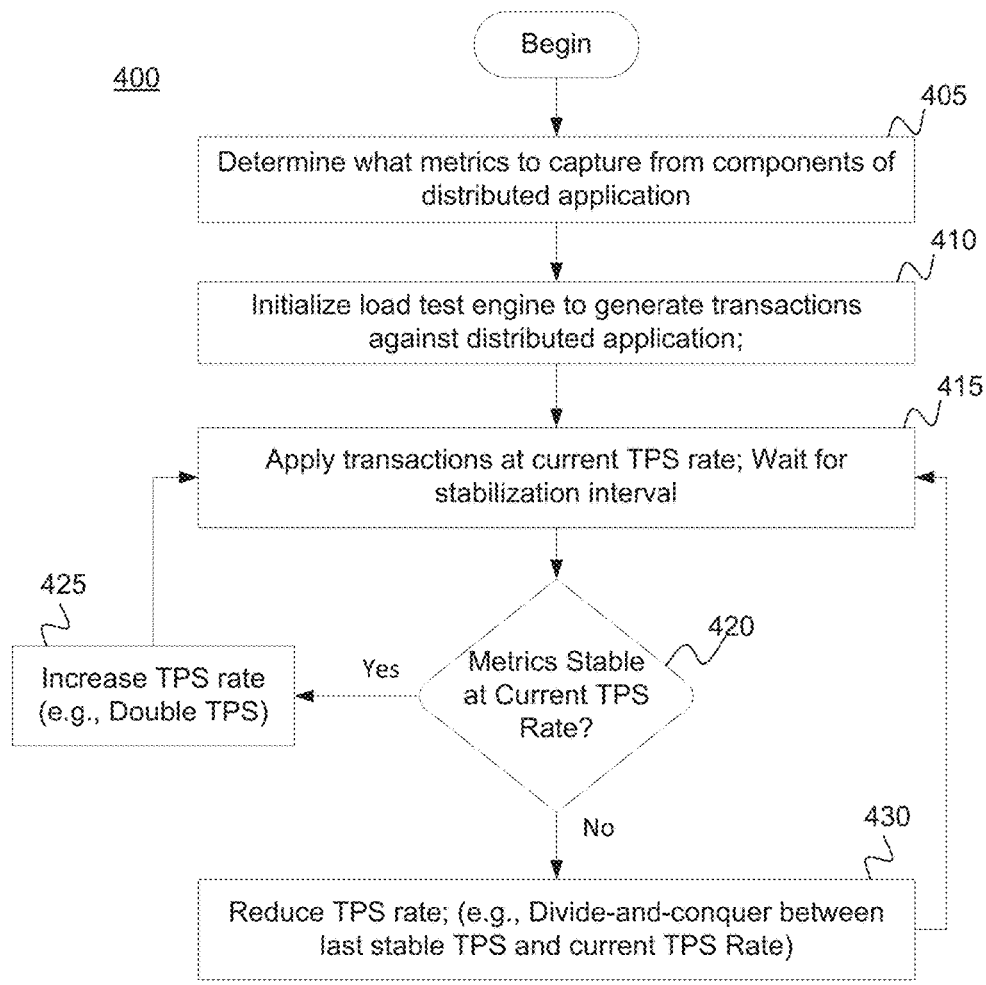
FIG. 4 illustrates a method for performing a load test on an asynchronous computing application or service, according to one embodiment.

FIG. 4 illustrates a method 400 for performing a load test on an asynchronous computing application or service, according to one embodiment. As shown, the method 400 begins at step 405 where the aggregate load test component determines what metrics to capture from components of a distributed application. That is, the aggregate load test component determines what remaining work pollers should be used to sample a distributed application under load. As noted, the remaining work pollers may be provided as client logic (e.g., a Java callable) by the owner of a distributed application being tested. At step 410, the aggregate load test component may initialize the load test engine to generate transactions against the distributed application. At step 415, the aggregate load test component generates transactions at the current TPS rate. For example, as described above, a TPS generator may generate transaction requests passed to a load engine. And in turn, the load engine may generate transactions directed to the application under test by invoking client code components associated with the application under test.

After a waiting interval to allow the TPS rate to be "felt" by the distributed application, the system captures sample metrics using the remaining work pollers to determine remaining work amounts at accumulation points of the distributed application. At step 420, the aggregate load test component may determine whether the remaining work at the accumulation points of the distributed application have stabilized at the current TPS rate, based on the sample points collected during the current test interval. If stable, then the aggregate load test component may increase (e.g., double) the TPS rate and return to step 415. Otherwise, if the sample data indicates the remaining work at one of the accumulation points is increasing (i.e., is unstable) or cannot be clustered, then the aggregate load test component may decrease the TPS rate (step 425). For example, at step 430 a divide-and-conquer strategy may be used where the current (unstable) TPS rate is halved between the last stable TPS rate and current unstable TPS rate until finding a stable TPS rate. This resulting stable TPS rate is then increased to halfway between the newly found stable TPS rate and the original unstable rate until again reaching an unstable TPS rate. Steps 415-430 may generally repeat until finding a maximum stable TPS rate to a degree of precision specified by the test parameters.

Figure 5:
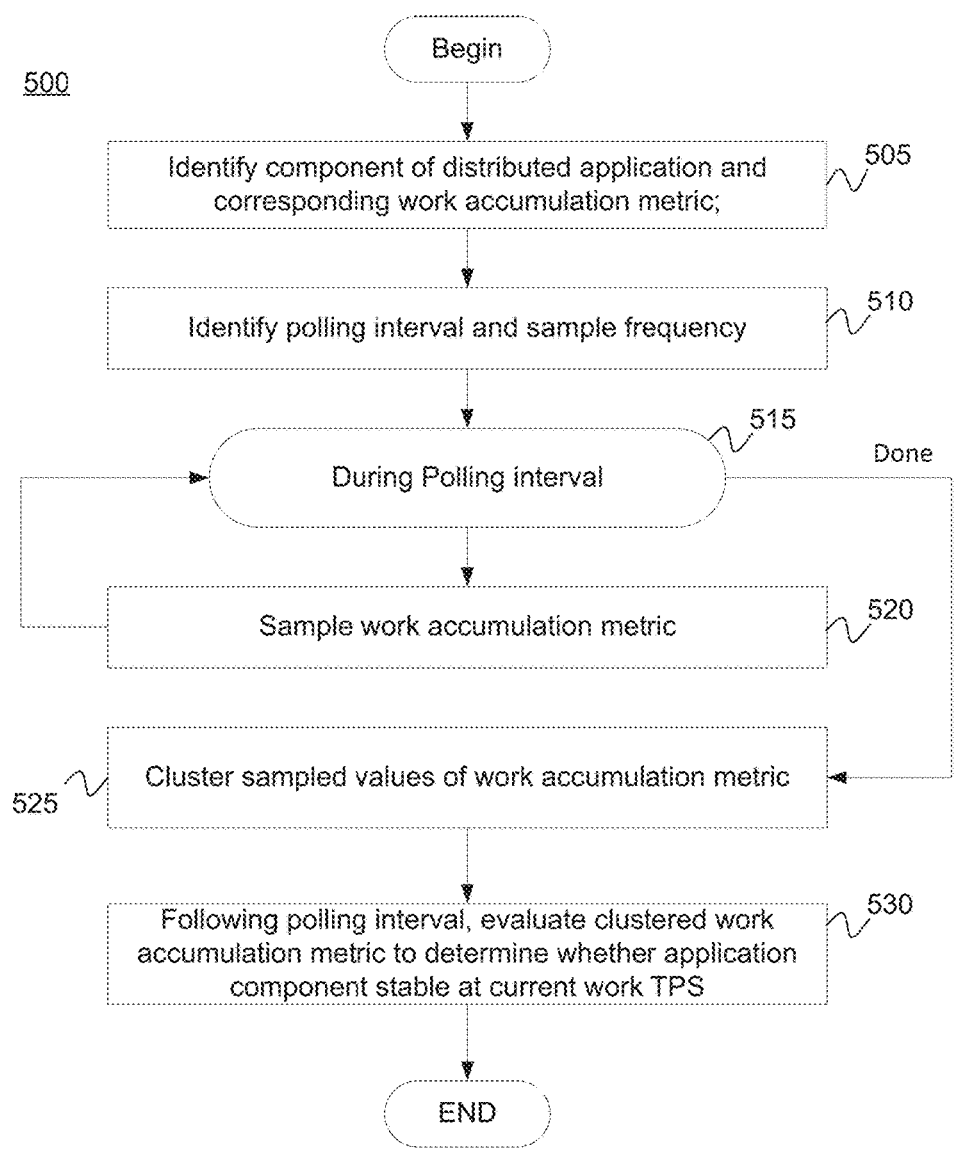
FIG. 5 illustrates a method for determining a measure of work accumulated at an aggregation point within an asynchronous application or service, according to one embodiment.

FIG. 5 illustrates a method 500 for determining a measure of work accumulated at an aggregation point within an asynchronous application or service, according to one embodiment. As shown, the method begins at step 505 where the aggregate load test component identifies a component of the distributed application under test and a corresponding work accumulation to measure during load testing. At step 510, the aggregate load test component identifies a polling interval and sample frequency. The polling interval may specify how long the distributed application should be subjected to a given TPS rate, and the sample frequency specifies how often to sample the remaining work at the component identified at step 505.

At step 515, a loop begins where the metric is sampled at the sample frequency during the polling interval. Accordingly, at step 520, the aggregate load test component samples the work accumulation metric. And at step 525, the resulting sample may be added to a cluster of sampled data. Following the polling interval, at step 530, the aggregate load test component evaluates the sample points of the metric to determine whether the application component is stable at the current TPS rate. As noted, e.g., the aggregate load test component may cluster the data points using a clustering technique, such as DBSCAN. In other cases, a regression analysis could be used to determine whether the remaining work is increasing over time during the polling interval.

Figure 6:
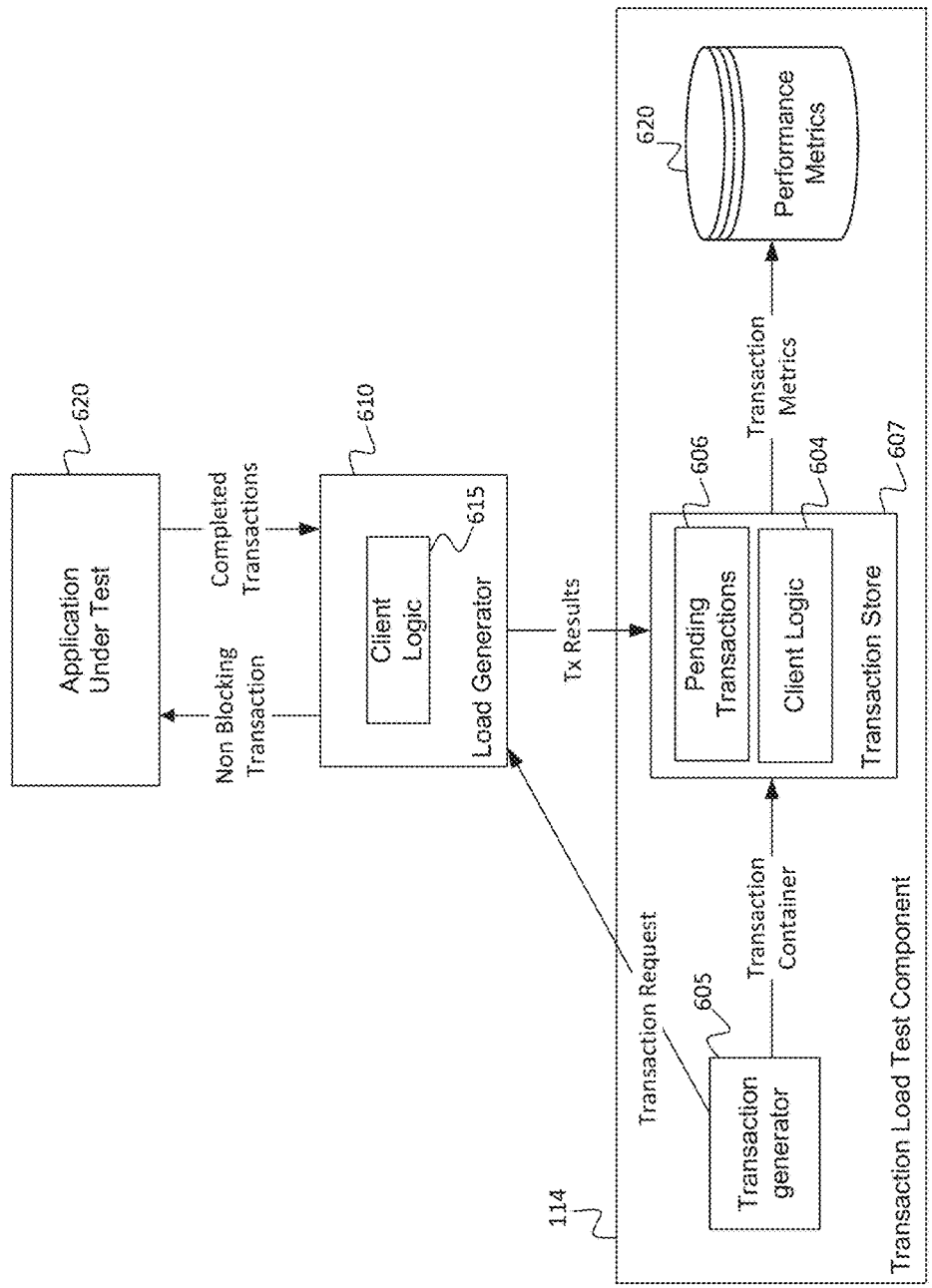
FIG. 6 illustrates components of a transaction load test component configured to track transactions initiated on an asynchronous application or service during load testing, according to one embodiment.

As noted above, In addition to the aggregate load test component, the test framework may also include a non-blocking load generator which can track individual transactions initiated on a distributed application during a load test. For example, FIG. 6 illustrates components of a transaction load test component 114 configured to track transactions initiated on an asynchronous application or service during load testing, according to one embodiment.

As shown, a test framework 600 includes the transaction load test component 114 and load generator 610, and the transaction load test component 114 itself includes a transaction generator 605, a transaction store 605, and performance metrics repository 620. In this example, the transaction generator 605 applies load to a distributed application 620 by sending transaction requests to the load generator 610. The transaction generator 605 may generate transaction requests at a rate corresponding to a desired TPS rate. In one embodiment, the transaction generator 605 also generates a container to associate with each requested transaction. The container may include the time when the transaction was initiated and any other metadata appropriate for a particular case. In response, the load generator 610 generates (or obtains) an identifier used by the distributed application 620 to process a given request (e.g., the order ID described above relative to a fulfillment pipeline used to process orders for digital media made at retail web site). For example, client logic 615 may be invoked to initiate a transaction on the distributed application 620 and obtain the identifier from the distributed application 620 (e.g., where the distributed application acknowledges each transaction request with an identifier). In other cases, the client logic 615 could generate and assign the identifier to a given transaction. The load generator 615 may associate the identifier used by the distributed application 620 with the container generated by the transaction generator 605. Doing so avoids the load generator 605 from having to block while the transaction is performed by the distributed application 620. Thus, once the identifier used by the distributed application 630 for a given transaction is obtained and associated with the container generated by transaction generator 605, the transaction generator 605 and the load generator 610 can free (or reuse) the resources used to initiate that transaction.

For example, computing threads in the transaction generator 605 and the load generator 610 can process new transactions instead of waiting for a current transaction to complete. Further, individual connections within the system may be long-lived or multiplexed. For example, application layer protocols (e.g., HTTP) may establish a TCP connection used by the load generator to submit multiple requests to the distributed application 620.

Once a transaction is kicked off by the load generator 610 (via client logic 615), the distributed application 620 carries out the transaction. In one embodiment, the load generator 610 may be notified that a transaction has completed. Alternatively, the load generator may poll the distributed application 620 to determine what transactions have been completed. In one embodiment, once a pending transaction is determined to have been completed, the load generator 610 passes a message to the load test component 114. In turn, the load test component 114 matches an identifier associated with a completed transaction with one of the pending transactions 606. That is, the load test component 114 identifies the container created when the transaction was initiated. In one embodiment, the number of pending transaction 606 could be monitored during a load test to determine whether the count of pending transactions stable. That is, while performing a load test using the transaction load test component 114, the number of outstanding transaction could be sampled as a work accumulation point by the aggregate load test component 112 using the techniques described above.

Once the container associated with a completed transaction identified, the load test component 114 may close the transaction (relative to load testing) by capturing performance metrics (e.g., by recording the time the transaction completed in the container). Further, the transaction load test component 114 may invoke any client logic 604 identified in the container (e.g., a Java callable). Such client logic 605 may finalize or perform any client-side actions needed to complete the transaction. Returning to the example of a retail website, the client logic 604 could be used to message the distributed application 620 that order transactions imitated and processed as part of load testing should not continue on to any fulfillment processes. In addition, the load test component 114 may capture transaction metrics stored in repository 620. For example, the transaction metrics may include a time when the traction was initiated and completed along with any other performance metrics that are relevant for a particular case. With this data the test framework 600 can determine, e.g., a rate at which transactions are completing, measure transaction latency, and faults. When a transaction completion rate is generally equal to the TPS rate, the maximum transaction rate has been reached.

Figure 7:
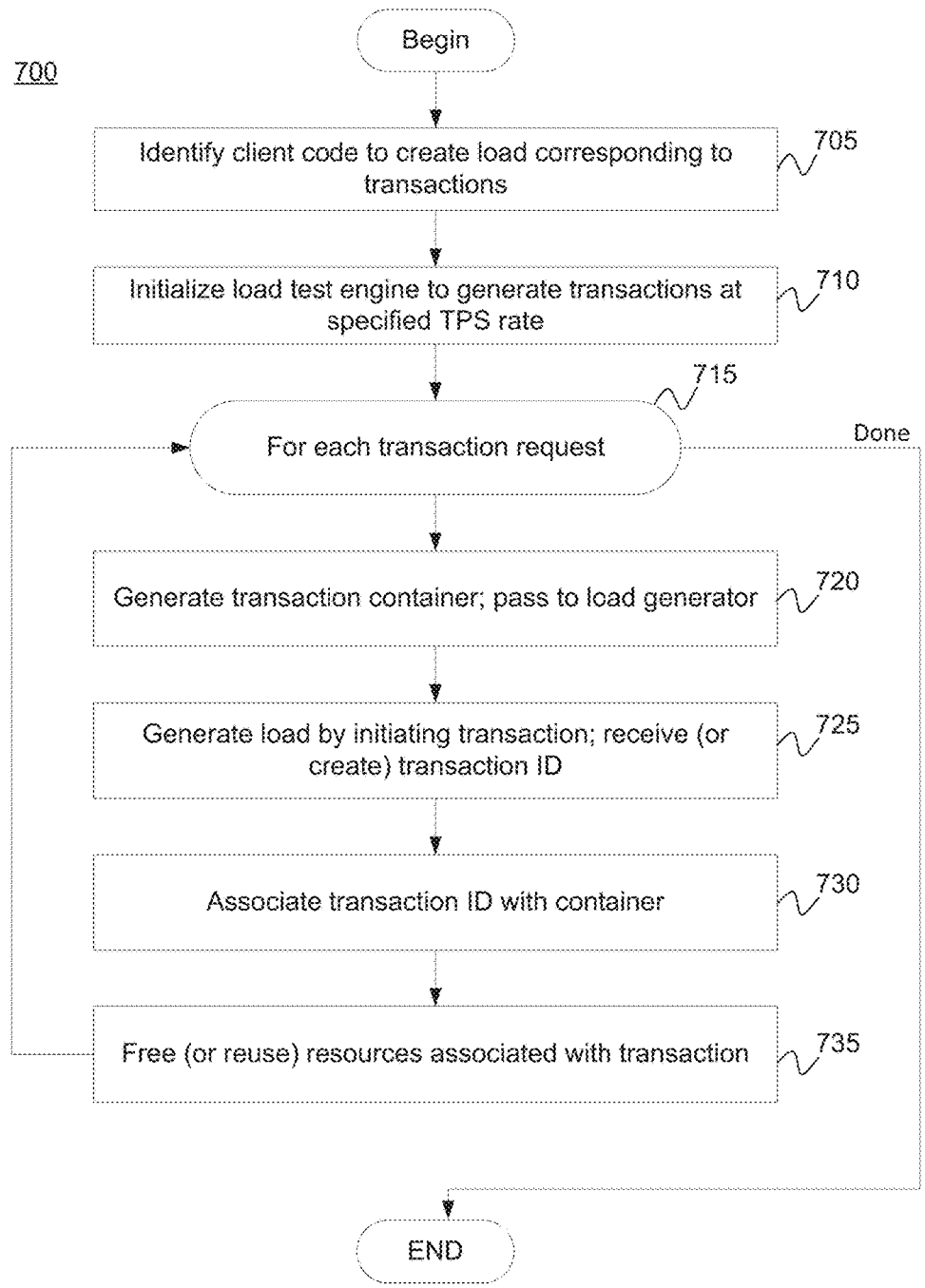
FIG. 7 illustrates a method for a non-blocking transaction generator to generate concurrent transactions as part of load testing an asynchronous application or service, according to one embodiment.

FIG. 7 illustrates a method 700 for a non-blocking transaction generator to generate concurrent transactions as part of load testing an asynchronous application or service, according to one embodiment. As shown, the method 700 begins at step 705 where the transaction load test component 114 identifies client logic used to generate load against a distributed application. As noted, the client logic is generally executed to generate transactions for a particular distributed application and to obtain identifiers used by the distributed application for each transaction. Further, each identifier may be associated with a container generated by the test framework.

At step 710, the test framework initializes the TPS generator and begins generating transaction requests at a given TPS rate. For example, in one embodiment, the TPS generator requests the load generator to kick off transactions with the distributed applications at the given TPS rate. At step 715, the test framework generator creates a transaction request. At step 720, the TPS generator crates a transaction container for the request. The container is stored in a repository, reflecting the pending transaction sent to the load generator. At step 725, the load generator initiates a new transaction with the distributed application and receives (or obtains) a transaction ID used by the distributed application to identify the transaction. The distributed application associates the transaction ID with the container created by the transaction load test component 114 (step 730). At step 730, the load test component 114 frees any resources used to create the container and initiate the new transaction on the distributed application. For example, any processing thread which initiated the transaction request may be freed to perform new work.

Figure 8:
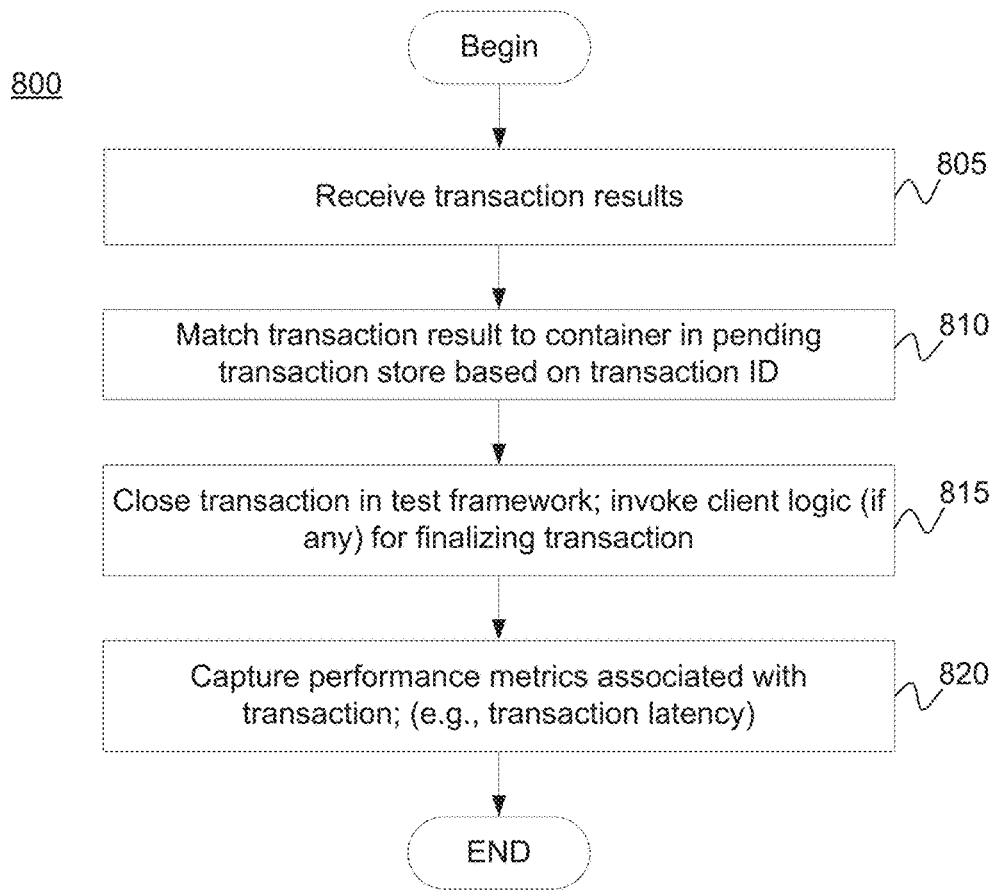
FIG. 8 illustrates a method for a non-blocking transaction generator to complete a transaction load test of an asynchronous application or service, according to one embodiment.

FIG. 8 illustrates a method 800 for a non-blocking transaction generator to complete a transaction load test of an asynchronous application or service, according to one embodiment. As shown, the method 800 begins at step 805, where the transaction load test component receives the results for one of the transactions initiated by the load generator. As noted, the transaction may be associated with an identifier generated by the distributed application under test. At step 815, the transaction load test component matches the identifier associated with the completed transaction with one of the containers in the pending transaction store and closes the transaction relative to load testing. Additionally, client logic (if any) referenced in the container may be invoked to complete the transaction relative to the distributed application under test. At step 820, the transaction load test component captures performance metrics associated with the transaction. For example, the transaction metrics may include a time when the traction was initiated and completed along with any other performance metrics that are relevant for a particular case.

Figure 9:
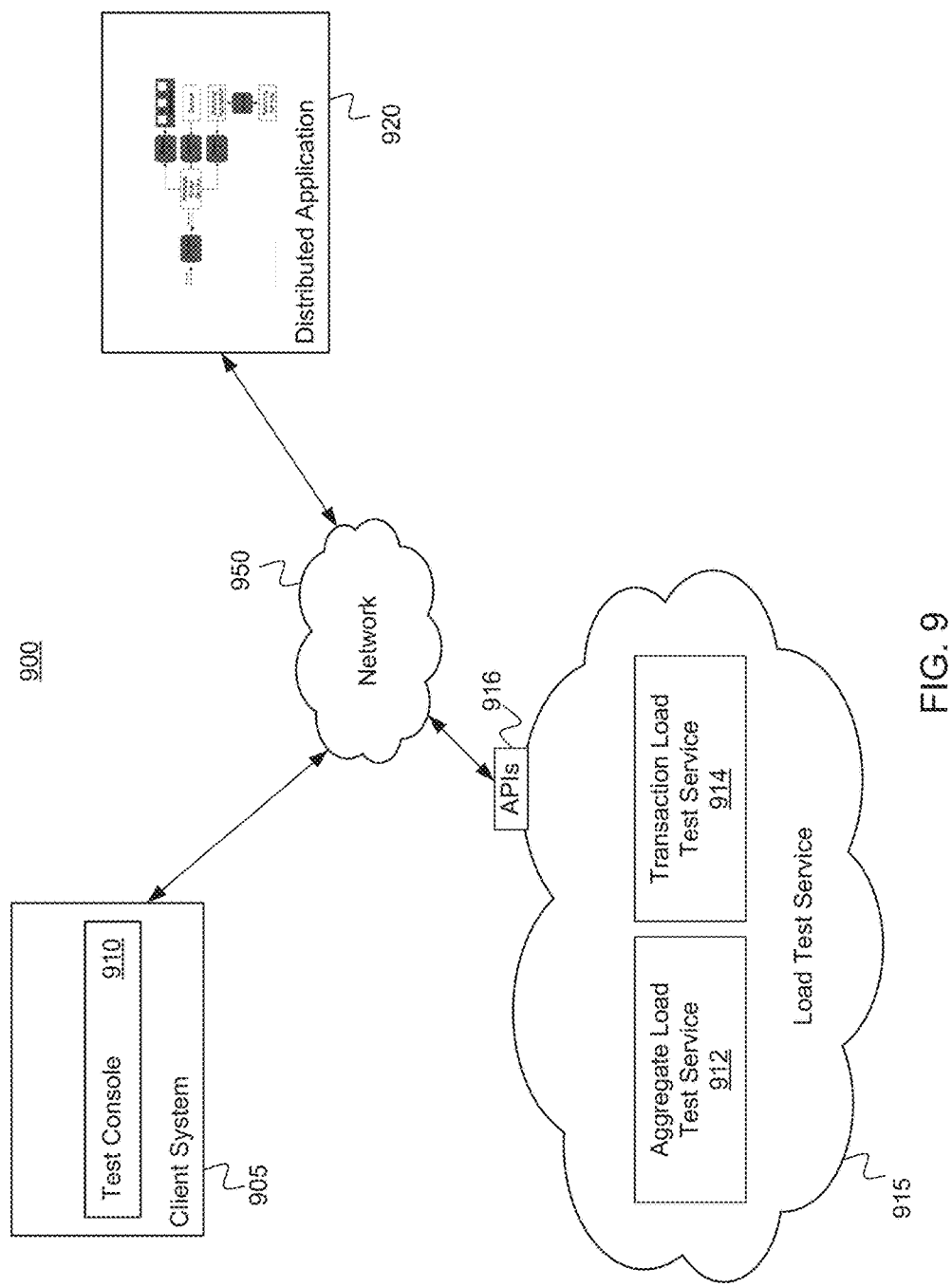
FIG. 9 illustrates a production web service hosting a test framework used to load test asynchronous applications, according to one embodiment.

FIG. 9 illustrates a computing cloud 915 hosting a load test service 902 used to test an asynchronous application or service, according to one embodiment. As shown, the load test service 902 is hosted on a computing cloud 915, and computing cloud 915, distributed application 920, and client system 905 are each connected to network 950 (e.g., the internet). As shown, the load test service 902 includes an aggregate load test service 912 and a transaction load test service 914.

Client system 905 is included to be representative of a general purpose computing system, such as a desktop or laptop computer hosting software development applications. For example, client system 905 may include an IDE tool, compiler, debugger, along with console tools used to build and deploy software applications and services included in distributed application 920. In one embodiment, a test console 910 is used to launch load tests against the distributed application 920 using the aggregate load test service 912 or transaction load test service 914. For example, the computing cloud 915 could include the load test service 902 as part of a service offering. Such a service offering could allow users to provision compute, storage, and network services used to host distributed application 920. Further, the service offering could include a variety of additional services, such as messaging, queuing, monitoring, load balancing, cloud formation, auto-scaling, and the like. Any suitable combination of such services may be provisioned for use by the distributed application 920 in a particular case.

In one embodiment, the service provider may expose the load test service 902 using a set of APIs 916, and test console 910 may use APIs 916 to initiate a load test on the distributed application 920 using the aggregate load test service 912 or the transaction load test service 914. In one embodiment, e.g., the APIs may be used to specify parameters for a given load test, such as a duration and TPS rate to apply during a load test, whether to determine a maximum TPS rate, a service address for distributed application 920, and the like. The APIs 916 may also be used to specify the client logic which can be used by a load generator to initiate transactions on the distributed application 920 during a load test and specify any logic to execute when transactions initiated during load test are complete (e.g., Java callable objects).

Figure 10:
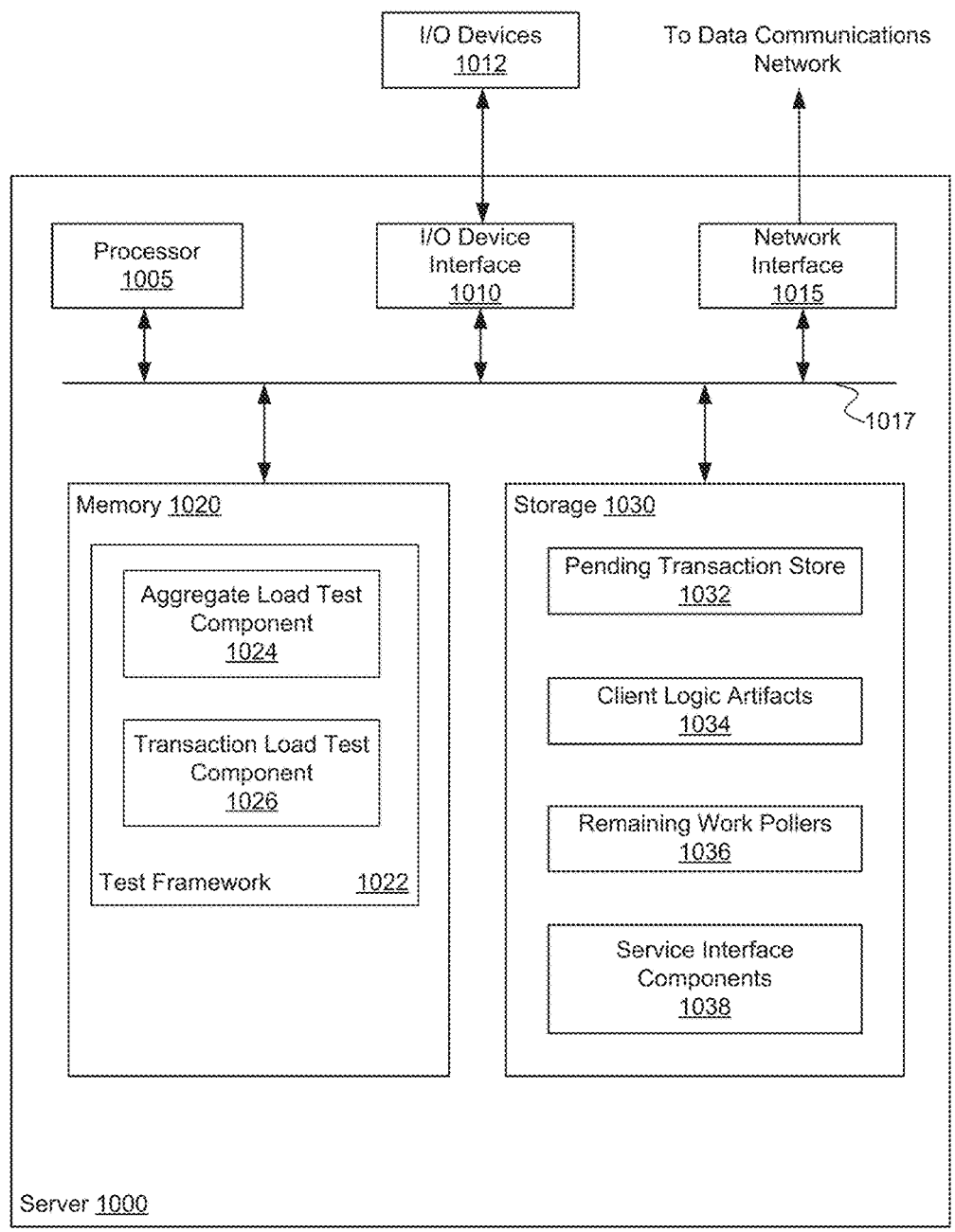
FIG. 10 illustrates an example computing system used to host a test framework, according to one embodiment.

FIG. 10 illustrates an example computing system 1000 used to host a test framework, according to one embodiment. As shown, the computing system 1000 includes, without limitation, a central processing unit (CPU) 1005, a network interface 1015, a memory 1020, and storage 1030, each connected to a bus 1017. The computing system 1000 may also include an I/O device interface 1010 connecting I/O devices 1012 (e.g., keyboard, display and mouse devices) to the computing system 1000. Further, in context of this disclosure, the computing elements shown in computing system 1000 may correspond to a physical computing system (e.g., a system in a data center) or may be a virtual computing instance executing within a computing cloud.

The CPU 1005 retrieves and executes programming instructions stored in the memory 1020 as well as stored in the storage 1030. The interconnect 1017 is used to transmit programming instructions and application data between the CPU 1005, I/O devices interface 1010, storage 1030, network interface 1015, and memory 1020. Note, CPU 1005 is included to be representative of a single CPU, multiple CPUs, a single CPU having multiple processing cores, and the like, and the memory 1020 is generally included to be representative of a random access memory. The storage 1030 may be a disk drive or flash storage device. Although shown as a single unit, the storage 1030 may be a combination of fixed and/or removable storage devices, such as fixed disc drives, removable memory cards, optical storage, network attached storage (NAS), or a storage area-network (SAN).

Illustratively, the memory 1020 includes a test framework 1022, which includes the aggregate load test component 1024 and the transaction load test component 1026, described above. Storage 1030 includes a pending transaction store 1032, client logic artifacts 1034, remaining work pollers 1036, and service interface components 1038. The client logic artifacts 1034 provide code used to initiate transactions against a given distributed application during load testing. Service interface components 1038 provide APIs used by clients to access the test framework 1022.

As described, the aggregate load test component 1024 may be used to determine whether a distributed application can handle a given TPS rate, as well as determine a maximum TPS rate a distributed application can sustain. To do so, the aggregate load test component 104 may use the remaining work pollers 1036 to determine a measure of how much work has accumulated at points in the distributed application during load testing. Generally, if the remaining work at one (or more) of the accumulation points is increasing while the TPS rate is held relatively constant, then the distributed application is presumed to be unable to handle that TPS rate.

The transaction load test component 1026 may be used to track individual transactions during load testing, without blocking while individual transactions are processed. As described, the transaction load test component 1026 may generate a container used to store an identifier used by the distributed application to identify a given transaction. Once the transaction is complete, the transaction load test component 1026 may use the identifier to correlate a completed transaction with a container in a pending transactions repository. This approach does not require that the transaction load test component 1026 block resources allocated to create a transaction while that transaction is performed by a distributed application during load testing. That is, any resources used by the transaction load test component 1026 to initiate a transaction may be freed or reused for other transactions.

Note, the above descriptions of embodiments of the present invention have been presented for purposes of illustration, but are not intended to be limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions executable to perform an operation for load testing a distributed application, the operation comprising:
   identifying one or more work accumulation points in the distributed application;
   generating a plurality of transaction requests to apply load to the distributed application;
   during a first time interval:
      sending the transaction requests to the distributed application at a first specified transaction rate; and
      determining, for each work accumulation point, a plurality of samples, each indicating a measure of remaining work to be performed by a respective component of the distributed application corresponding to the respective work accumulation point;
   determining whether the remaining work for at least a first one of the work accumulation points is increasing over the first time interval; and
   upon determining the remaining work for the first accumulation point is not increasing over the first time interval, and by operation of one or more computer processors when executing the instructions, increasing the first specified transaction rate to use in applying load to the distributed application during a second time interval.

2. The non-transitory computer-readable medium of claim 1, wherein the operation further comprises:
   upon determining the remaining work for at least the first accumulation point is increasing over the first time interval, decreasing the first specified transaction rate to use in applying load to the distributed application during the second time interval.

3. The non-transitory computer-readable medium of claim 2, wherein decreasing the first specified transaction rate to use in applying load to the distributed application during the second time interval comprises decreasing the first specified transaction rate to a rate between the first specified transaction rate and a prior transaction rate.

4. The non-transitory computer-readable medium of claim 2, wherein the operation further comprises: following the second time interval, either increasing or decreasing the first specified transaction rate during one or more subsequent time intervals until identifying, to a specified degree of precision, a maximum rate at which the remaining work for the first accumulation point does not increase over the one or more subsequent time intervals.

5. The non-transitory computer-readable medium of claim 1, wherein determining whether the remaining work for at least the first one of the work accumulation points is increasing over the first time interval, comprises:
   clustering the plurality of samples of remaining work; and
   determining whether the clustered samples indicate an amount of remaining work for the first accumulation point stabilizes over the first time interval.

6. The non-transitory computer-readable medium of claim 1, wherein increasing the first specified transaction rate to use in applying load to the distributed application during the second time interval comprises doubling the specified transaction rate.

7. The non-transitory computer-readable medium of claim 1, wherein each respective component of the distributed application comprises one of a queue, a workflow, and a batching database.

8. A system, comprising:
one or more computer processors; and
a memory containing a program which, when executed on the one or more computer processors, performs an operation for load testing a distributed application, the operation comprising:
sending transaction requests to the distributed application at a specified transaction rate for at least a first time interval;
sampling at least a first component of the distributed application during the first time interval to determine a set of measures of remaining work to be processed by the first component of the distributed application; and
determining whether the first component can support the specified transaction rate based on at least the set of measures of remaining work.

9. The system of claim 8, wherein determining whether the first component can support the specified transaction rate comprises determining whether an amount of remaining work to be processed by the first component increases over the first time interval based on at least the set of measures of remaining work.

10. The system of claim 9, wherein the operation further comprises:
upon determining that the amount of remaining work to be processed by the first component is not increasing over the first time interval, increasing the specified transaction rate;
sending transaction requests to the distributed application at the increased transaction rate for at least a second time interval;
sampling the first component of the distributed application over the second time interval to determine a second set of measures of remaining work to be processed by the first component of the distributed application; and
determining whether the amount of remaining work to be processed by the first component increases over the second time interval.

11. The system of claim 10, wherein increasing the specified transaction rate for the second time interval comprises doubling the specified transaction rate.

12. The system of claim 9, wherein the operation further comprises:
upon determining that the amount of remaining work to be processed by the first component is increasing over the first time interval, decreasing the specified transaction rate;
sending transaction requests to the distributed application at the decreased transaction rate for at least a second time interval;
sampling the first component of the distributed application over the second time interval to determine a second set of measures of remaining work to be processed by the first component of the distributed application; and
determining whether the amount of remaining work to be processed by the first component increases over the second time interval.

13. The system of claim 12, wherein the specified transaction rate is decreased to a transaction rate between the specified transaction rate and a prior transaction rate used to apply load to the distributed application during a prior time interval.

14. The system of claim 8, wherein determining whether the first component can support the specified transaction rate, comprises:
clustering the set of measures of remaining work to be processed by the first component of the distributed application; and
determining whether the clustered measures of remaining work indicate an amount of remaining work for a first accumulation point stabilizes over the first time interval.

15. The system of claim 8, wherein the first component of the distributed application comprises one of a queue, a workflow, and a batching database used in processing transaction requests sent to the distributed application.

16. The system of claim 8, wherein the distributed application comprises a computing service provisioned using services hosted by a cloud computing service, and wherein the transaction requests are sent to the distributed application using one or more application program interfaces (APIs) exposed by the distributed application.

17. A computer-implemented method for load testing a distributed application at a specified transactions-per-second (TPS) rate, the method, comprising:
receiving a set of remaining-work pollers associated with the distributed application, wherein each remaining-work poller is invoked to measure an amount of work remaining at a corresponding work accumulation point in the distributed application;
receiving one or more functions called to initiate a transaction on the distributed application;
during a first time interval:
initiating, by operation of one or more computer processors, transactions on the distributed application at the specified TPS rate by repeatedly calling the one or more functions; and
generating a set of measures of the amount of work remaining at each of the work accumulation points by invoking the set of remaining-work pollers corresponding to the respective work accumulation point; and
evaluating the set of measures for each work accumulation point to determine whether the amount of work remaining at each of the one or more work accumulation points stabilizes over the first time interval.

18. The computer-implemented method of claim 17, further comprising, upon determining the amount of work remaining at a first one of the work accumulation points does not stabilize over the first time interval:
identifying a component of the distributed application associated with the first work accumulation point; and
generating a message indicating the identified component is unable to support the specified TPS rate.

19. The computer-implemented method of claim 18, wherein determining the amount of work remaining at the first work accumulation point does not stabilize over the first time interval comprises determining that the amount of remaining work is increasing over the first time interval.

20. The computer-implemented method of claim 19, wherein the identified component of the distributed application comprises one of a queue, a workflow, and a batching database used to process the transactions initiated on the distributed application.

* * * * *